(12) United States Patent
Yoo et al.

(10) Patent No.: US 8,733,790 B2
(45) Date of Patent: May 27, 2014

(54) ACTIVE SAFETY APPARATUS FOR VEHICLES AND METHOD OF CONTROLLING THE SAME

(75) Inventors: Jae Haeng Yoo, Yongin-si (KR); Dae Young Kwak, Yongin-si (KR); Hyun Yong Jeong, Seoul (KR); Won Min Choi, Seoul (KR)

(73) Assignees: Hyundai Motor Company, Seoul (KR); Industry-University Cooperation Foundation Sogang University, Seoul (KR)

( * ) Notice: Subject to any disclaimer, the term of this patent is extended or adjusted under 35 U.S.C. 154(b) by 191 days.

(21) Appl. No.: 13/303,800

(22) Filed: Nov. 23, 2011

(65) Prior Publication Data

US 2013/0020789 A1    Jan. 24, 2013

(30) Foreign Application Priority Data

Jul. 19, 2011   (KR) .................. 10-2011-0071255

(51) Int. Cl.
*B60R 21/0136* (2006.01)
*B60R 22/46* (2006.01)
*B60R 21/015* (2006.01)

(52) U.S. Cl.
USPC ........ 280/735; 280/801.1; 280/806; 180/268; 180/274; 701/45

(58) Field of Classification Search
USPC .......... 280/735, 801.1, 805, 806; 701/45, 46, 701/47; 180/274, 268
See application file for complete search history.

(56) References Cited

U.S. PATENT DOCUMENTS

| | | | | |
|---|---|---|---|---|
| 5,448,233 | A * | 9/1995 | Saban et al. .................. | 340/963 |
| 5,667,244 | A * | 9/1997 | Ito et al. ........................ | 280/735 |
| 5,814,897 | A * | 9/1998 | Ito et al. ....................... | 307/10.1 |
| 6,183,015 | B1 * | 2/2001 | Smithson et al. ............. | 280/805 |
| 6,188,940 | B1 * | 2/2001 | Blackburn et al. ............. | 701/45 |
| 6,213,510 | B1 * | 4/2001 | Suyama ........................ | 280/805 |
| 6,424,898 | B2 * | 7/2002 | Anishetty et al. .............. | 701/45 |
| 6,494,284 | B1 * | 12/2002 | Cooper ......................... | 180/282 |
| 6,816,766 | B2 * | 11/2004 | Sala et al. ...................... | 701/45 |
| 7,284,769 | B2 * | 10/2007 | Breed .......................... | 280/735 |
| 7,831,358 | B2 * | 11/2010 | Breed et al. ..................... | 701/45 |
| 7,887,089 | B2 * | 2/2011 | Breed et al. .................. | 280/735 |
| 2003/0097212 | A1 * | 5/2003 | Feser et al. ...................... | 701/45 |

(Continued)

FOREIGN PATENT DOCUMENTS

| | | |
|---|---|---|
| JP | 2008-049718 A | 3/2008 |
| KR | 2001-0066080 A | 7/2001 |
| KR | 10-2004-0041350 A | 5/2004 |

*Primary Examiner* — Paul N Dickson
*Assistant Examiner* — George Spisich
(74) *Attorney, Agent, or Firm* — Morgan, Lewis & Bockius LLP

(57) ABSTRACT

An active safety apparatus for vehicles and a method of controlling the apparatus, which can actively control the operation of a safety device, such as an airbag device or a seatbelt device installed in a vehicle for restraining a passenger behavior and protecting a passenger in a vehicle collision, based on the conditions of a vehicle collision and the passenger behavior which vary depending on the conditions of the vehicle collision, thereby optimally protecting the passenger for the conditions of the vehicle collision and improving passenger safety of the vehicle.

5 Claims, 5 Drawing Sheets

(56) References Cited

U.S. PATENT DOCUMENTS

| | | | |
|---|---|---|---|
| 2006/0028005 A1* | 2/2006 | Dell' Eva et al. | 280/735 |
| 2006/0232052 A1* | 10/2006 | Breed | 280/735 |
| 2008/0054603 A1* | 3/2008 | Breed et al. | 280/729 |
| 2008/0119993 A1* | 5/2008 | Breed | 701/46 |
| 2008/0185825 A1* | 8/2008 | Stuetzler et al. | 280/735 |
| 2008/0208413 A1* | 8/2008 | Willig et al. | 701/45 |
| 2010/0042296 A1* | 2/2010 | Brandmeier et al. | 701/46 |
| 2012/0265407 A1* | 10/2012 | Zimmermann et al. | 701/45 |

* cited by examiner

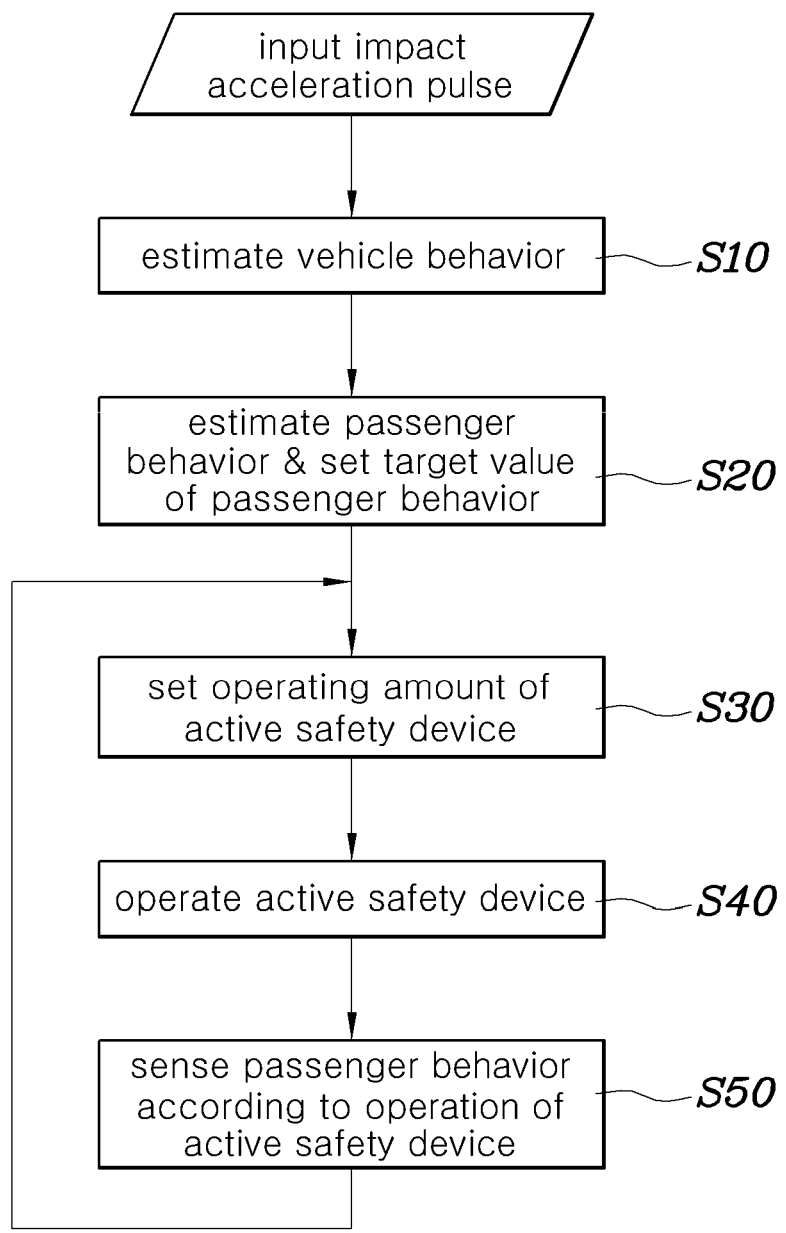

ACTIVE SAFETY APPARATUS FOR VEHICLES AND METHOD OF CONTROLLING THE SAME

CROSS-REFERENCE TO RELATED APPLICATION

The present application claims priority to Korean Patent Application No. 10-2011-0071255, filed on Jul. 19, 2011, the entire contents of which is incorporated herein for all purposes by this reference.

BACKGROUND OF THE INVENTION

1. Field of the Invention

The present invention relates, in general, to an active safety apparatus for vehicles and, more particularly, to a technique of realizing optimal safety performance for a vehicle in the event of a vehicle collision by actively restraining passenger behavior in response to variations in passenger behavior in real time.

2. Description of Related Art

Airbag devices and seatbelt devices are representative examples of safety devices for vehicles. A conventional airbag device or a conventional seatbelt device has a drive mechanism as shown in FIG. 1. When a vehicle collision occurs, an airbag ECU or an FIS (Frontal Impact Sensor) outputs an airbag expanding signal so as to expand an airbag, and a seatbelt tension control device is operated to restrain the movement of a passenger.

However, the conventional safety device for vehicles is problematic in that once an operating signal is applied to the safety device in response to a vehicle collision, the safety device is expanded or operated by a predetermined physical quantity, such as a preset pressure or preset load, to protect a passenger, so that the safety device may fail to optimally protect the passenger given a specific vehicle collision condition or the vehicle collision velocity.

In other words, passenger behavior may greatly change depending on the vehicle collision conditions or the velocity of the vehicle collision. However, the conventional mechanism in which the passenger behavior is limited by a predetermined physical quantity may fail to optimally protect the passenger for a specific vehicle collision.

For reference, examples of cited documents disclosing a technique used to control the pressure at which an airbag expands or the strength with which a seatbelt is pulled in a vehicle collision are as follows.

Cited document 1: KR10-2004-0041350 A
Cited document 2: KR10-2001-0066080 A

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active safety apparatus for vehicles and a method of controlling the apparatus, which can actively control the operation of a safety device, such as an airbag device or a seatbelt device installed in a vehicle for restraining passenger behavior and protecting a passenger in a vehicle collision, according to the conditions of the vehicle collision and the relation to the conditions of the vehicle collision, thereby optimally protecting the passenger in a state optimized for the conditions of the vehicle collision and improving the passenger safety of the vehicle.

In an aspect of the present invention, the active safety apparatus for a vehicle, may include an impact sensing unit for sensing an impact acceleration of the vehicle, an active controller for estimating a vehicle behavior using an impact acceleration pulse output from the impact sensing unit, estimating a passenger behavior according to the estimated vehicle behavior, setting a target value of the passenger behavior which satisfies a restraining condition realizing passenger safety according to the estimated passenger behavior, setting an operating amount of an active safety device to realize the target value of the passenger behavior, and operating the active safety device according to the operating amount, and a sensing unit for sensing a result of operating the active safety device and sending the sensed result to the active controller.

In another aspect of the present invention, a method of controlling an active safety apparatus for a vehicle may include estimating a vehicle behavior using an impact acceleration pulse of the vehicle, estimating a passenger behavior based on the estimated vehicle behavior and setting a target value of the passenger behavior which satisfies a restraining condition realizing a passenger safety based on the estimated passenger behavior, setting an operating amount of an active safety device realizing the target value of the passenger behavior, and operating the active safety device according to the operating amount.

Accordingly, the present invention can actively control the operation of a safety device, such as an airbag device or a seatbelt device installed in a vehicle for restraining the behavior of a passenger and protecting a passenger involved in a vehicle collision, according to the conditions of the vehicle collision and the passenger behavior which varies in relation to the conditions of the vehicle collision, thereby optimally protecting the passenger in a state optimized for the conditions of the vehicle collision and improving the passenger safety of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a flowchart of a method of controlling the active safety apparatus for vehicles according to an exemplary embodiment of the present invention.

Figure 1:
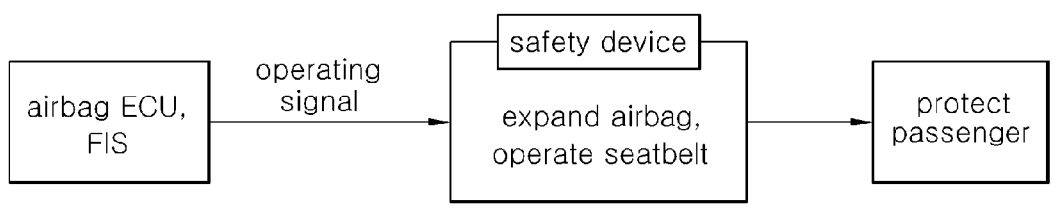
FIG. 1 is a block diagram showing the operation of a conventional safety device installed in a vehicle.
Figure 2:
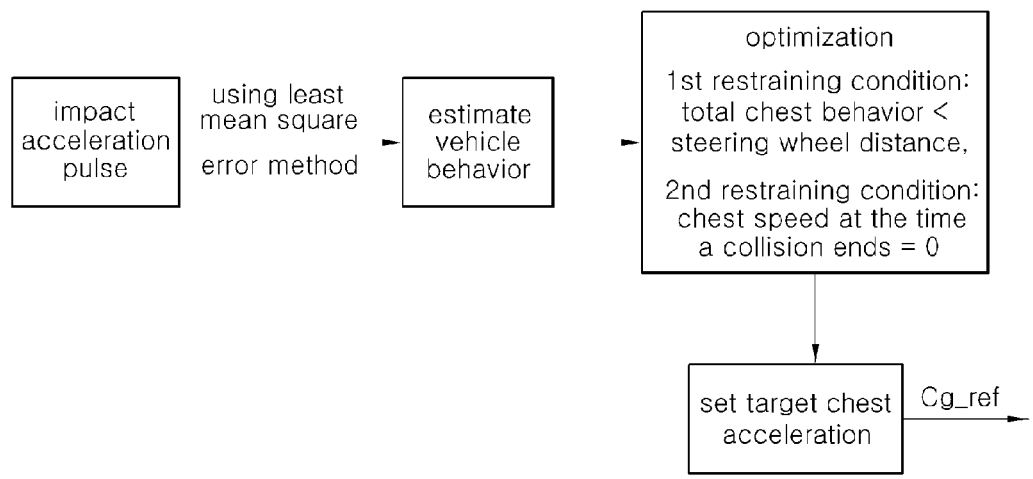
FIG. 2 is a block diagram showing the configuration of an active safety apparatus for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to a preferred embodiment of the invention with reference to the accompanying drawings.

As shown in FIG. 2 through FIG. 5, an active safety apparatus for vehicles according to an exemplary embodiment of the present invention includes: an impact sensing unit 1 for sensing the impact acceleration of a vehicle, an active controller 3 for estimating vehicle behavior using an impact acceleration pulse output from the impact sensing unit 1, estimating passenger behavior according to the estimated vehicle behavior, setting a target value of the passenger behavior which can satisfy a restraining condition capable of realizing passenger safety according to the estimated passenger behavior, setting an operating amount of an active safety device capable of realizing the target value of passenger behavior, and driving the active safety device according to the preset operating amount, the active safety device 5 controlled by the active controller 3 and protecting a passenger, and a smart sensing unit 7 for sensing results of operating the active safety device 5 and giving the sensed operational results to the active controller 3.

The impact sensing unit 1 may use an impact sensor, such as a front impact sensor (FIS). Of course, the active controller 3 may receive information about the impact acceleration of the vehicle from a conventional airbag ECU and, in the above case, the airbag ECU will function as the impact sensing unit 1.

The active controller 3 is configured in such a way that it can receive the results of operating the active safety device 5 from the smart sensing unit 7 and can feedback-control the active safety device 5.

Described in detail, the active controller 3 performs feedback control in such a way that the active controller repeatedly and periodically sets the target value for passenger behavior by estimating both the vehicle behavior and the passenger behavior at a predetermined period, and resets the operating amount of the active safety device 5 by applying a correction value Cg to a reference value Cg-ref after setting the target value of passenger behavior to be equal to the reference value Cg-ref (a reference value of a passenger's chest acceleration) and setting the results of operating the active safety device 5 output from the smart sensing unit 7 to be equal to the correction value Cg.

Therefore, when a vehicle collision occurs, the active controller 3 repeatedly determines the target value of passenger behavior according to the conditions of the vehicle collision, and operates the active safety device 5 according to the determined target value, and continuously feedback-controls the active safety device 5 by taking into account the passenger behavior, which is the results of operating the active safety device 5, in real-time, so that the active safety device 5 can operate in a manner optimized for the conditions of the vehicle collision and can optimally restrain a passenger in a state optimized for the conditions of the vehicle collision, thereby improving passenger safety in the case of vehicle collision.

The active controller 3 can set the operating amount of the active safety device 5 using a first linear model in which a result determined by applying the correction value Cg to the reference value Cg-ref of the target value of passenger behavior is set to an independent variable and the operating amount of the active safety device 5 is set to a dependent variable.

Further, the active controller 3 can determine the correction value Cg using a second linear model in which a signal output from the smart sensing unit 7 is set to an independent variable and the correction value Cg is set to a dependent variable.

Further, the active safety device 5 is configured in such a way that the operating amount thereof can vary in real-time under the control of the active controller 3. For example, when the active safety device 5 is an airbag device, the airbag device may be configured in such a way that the flow rate and flow velocity of expansion gas supplied from an inflator to an airbag cushion, the opening ratio of a vent hole, or the tensile force of a tether can be controlled in real-time.

Further, when a seatbelt device is used as the active safety device 5, the seatbelt device may be configured in such a way that it can be controlled in real-time to change the force resisting the unwinding of a webbing or to actively pull or release the webbing.

Further, the smart sensing unit 7 is configured in such a way that it can measure passenger behavior in real-time according to the operation of the active safety device 5 and can output the passenger behavior to the active controller 3. For example, the smart sensing unit 7 may be configured in such a way that it can sense the degree to which the seatbelt has unwound in real-time, thereby sensing the information about the unwound amount, the unwinding velocity or the unwinding acceleration of the seatbelt and converting the information into passenger behavior, or can photograph the passenger's motion in real-time, thereby sensing passenger behavior according to the variation in the image of the passenger's motion.

Figure 3:
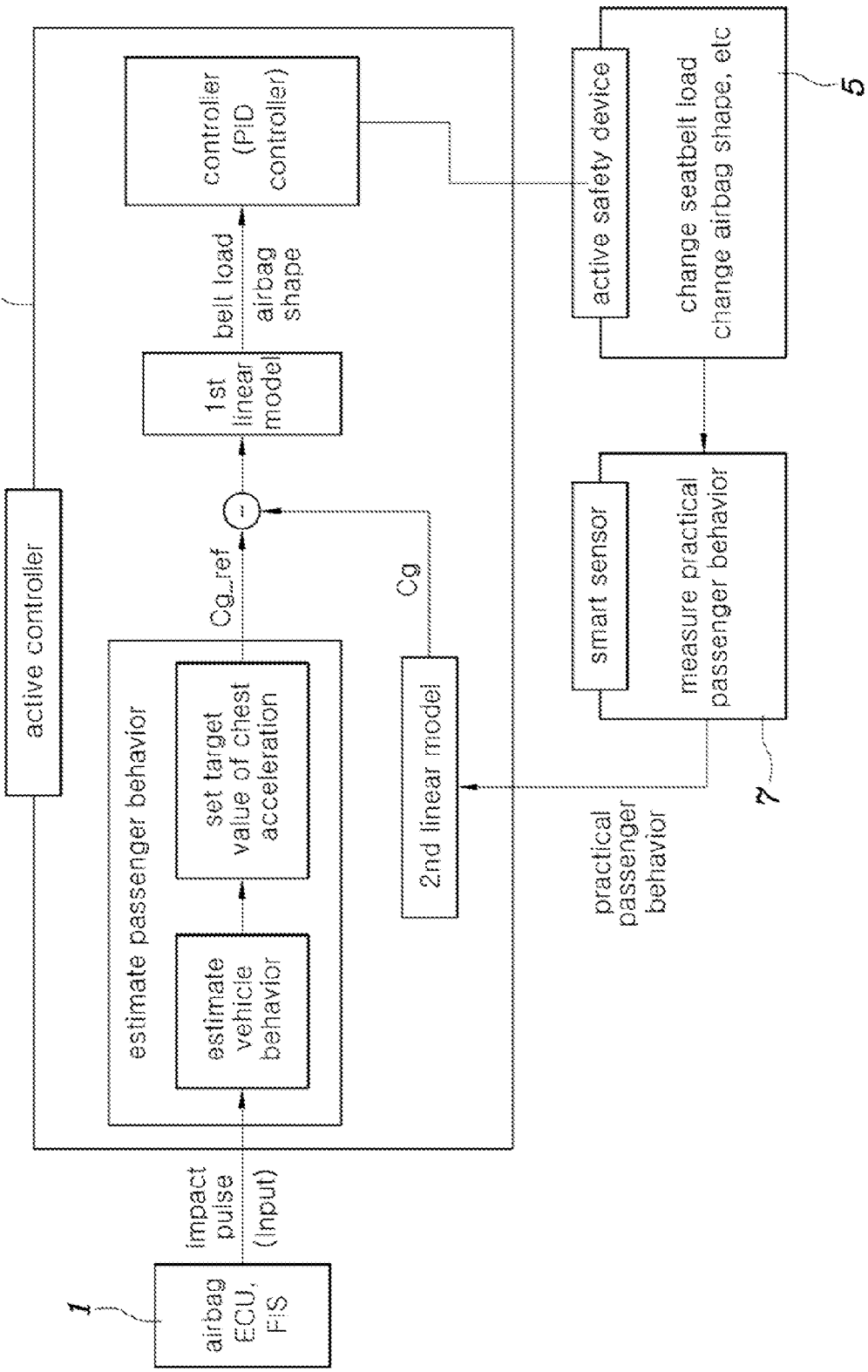
FIG. 3 is a block diagram showing a process of setting a target value for passenger behavior by estimating the passenger behavior using the active controller of FIG. 2.
Figure 4:
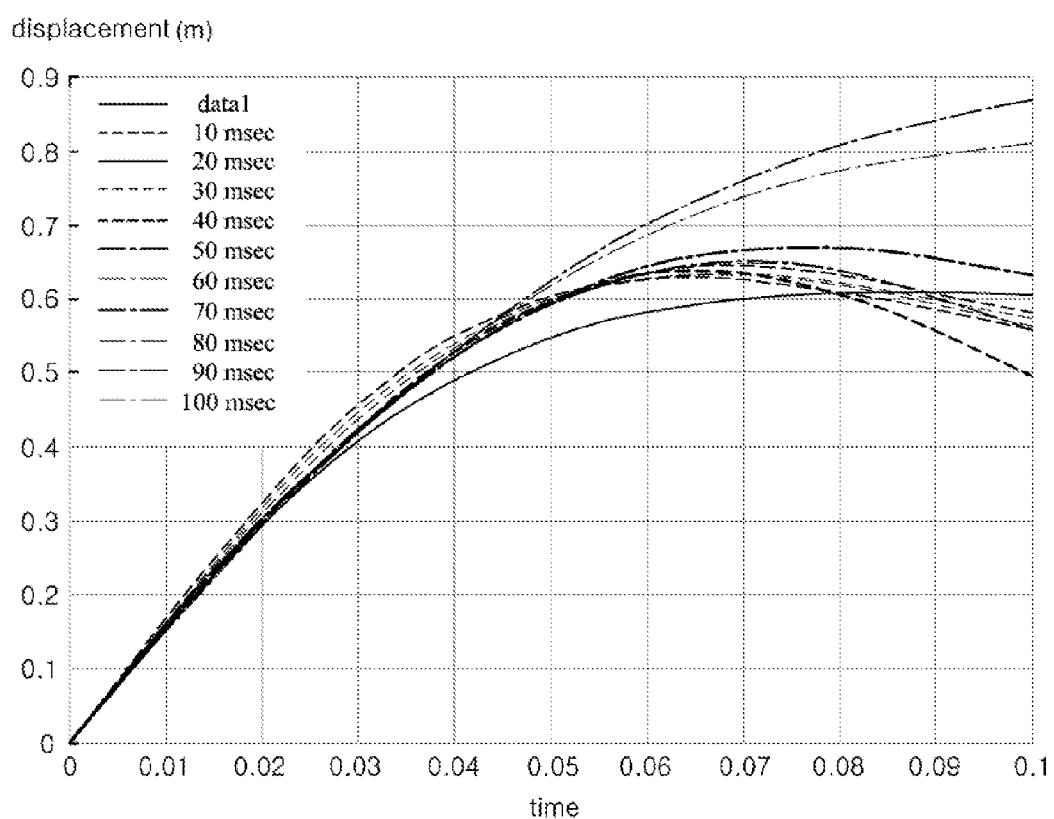
FIG. 4 is a graph showing the vehicle behavior estimated by the active controller of FIG. 2 as a function of a time.
Figure 5:
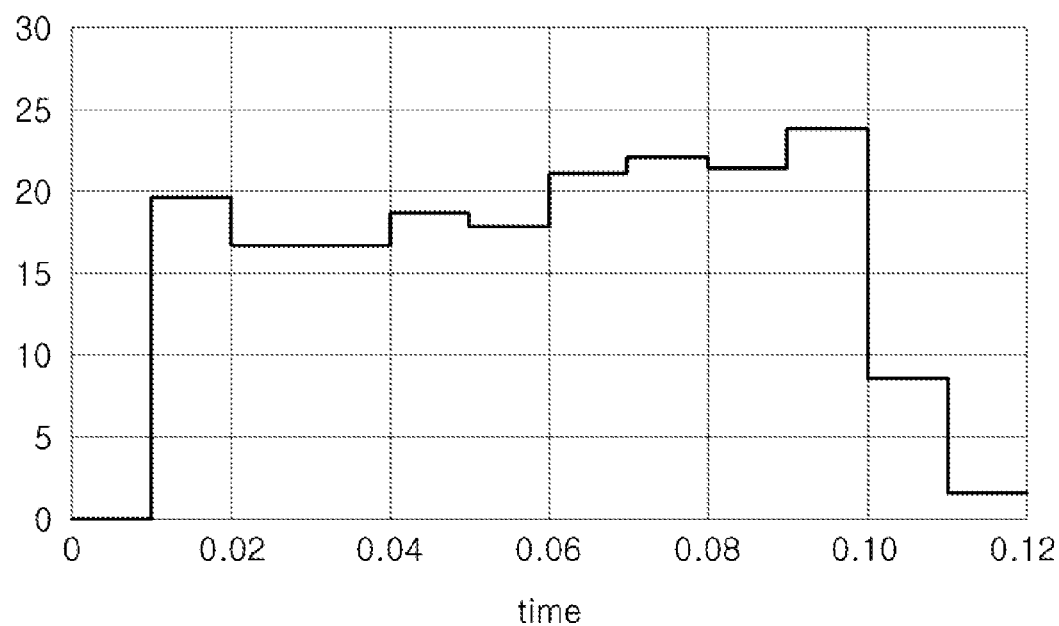
FIG. 5 is a graph showing the target chest acceleration determined by the active controller of FIG. 2 as a function of a time.

Here, the process in which the active controller 3 receives information about an impact acceleration of the vehicle from the impact sensing unit 1 and sets the target value of the passenger behavior will be described with reference to FIG. 3 through FIG. 5.

The active controller 3 can establish a target chest acceleration, that is, the target value of the passenger behavior, by estimating the vehicle behavior by treating an impact acceleration pulse output from the impact sensing unit 1 using the least mean square error method, by estimating the passenger behavior according to the estimated vehicle behavior, and by optimizing the restraining condition capable of realizing passenger safety given the estimated passenger behavior in such a way that both a condition in which the total chest behavior of the passenger is less than a distance between a passenger's chest and a steering wheel just before a vehicle collision and a condition in which a passenger's chest speed is zero at the time a collision ends can be satisfied. For reference, FIG. 4 is a graph showing the vehicle behavior, which is a displacement repeatedly estimated at an interval of 10 msec after a vehicle collision, as a function of time. FIG. 5 is a graph showing a target chest acceleration, which is the target value of the passenger behavior preset to satisfy a restraining condition capable of realizing passenger safety based on the estimate of the passenger behavior made according to the estimated vehicle behavior, as a function of time.

The operation of the active safety apparatus for vehicles according to an exemplary embodiment of the present invention will be controlled by the following method.

That is, as shown in FIG. 6, the method of controlling the active safety apparatus for vehicles according to an exemplary embodiment of the present invention includes: a vehicle behavior estimating operation S10 of estimating a vehicle behavior using an impact acceleration pulse of a vehicle, a passenger behavior estimating operation S20 of estimating passenger behavior based on the estimated vehicle behavior and of setting a target value for passenger behavior which can satisfy a restraining condition capable of realizing passenger safety according to the estimated passenger behavior, an operating amount setting operation S30 of setting an operating amount of the active safety device 5 capable of realizing the target value of the passenger behavior, and a device driving operation S40 of driving the active safety device 5 according to the preset operating amount.

Further, feedback control is performed. In the feedback control, the passenger behavior according to operation of the active safety device 5 after the device driving operation S40 is sensed and the operating amount of the active safety device 5 is established by taking into account the sensed passenger behavior in the operating amount setting operation S30.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active safety apparatus for a vehicle, comprising:
an impact sensing unit for sensing an impact acceleration of the vehicle;
an active controller for estimating a vehicle behavior using an impact acceleration pulse output from the impact sensing unit, estimating a passenger behavior according to the estimated vehicle behavior, setting a target value of the passenger behavior which satisfies a restraining condition realizing passenger safety according to the estimated passenger behavior, setting an operating amount of an active safety device to realize the target value of the passenger behavior, and operating the active safety device according to the operating amount; and
a sensing unit for sensing a result of operating the active safety device and sending the sensed result to the active controller;
wherein the active controller performs control using feedback in such a way that the active controller repeatedly and periodically sets the target value of the passenger behavior by estimating both the vehicle behavior and the passenger behavior at a predetermined period, and resets the operating amount of the active safety device by applying a correction value to a reference value after setting the target value of the passenger behavior to be equal to the reference value and setting the sensed result of operating the active safety device output from the sensing unit to be equal to the correction value;
wherein the active controller sets the operating amount of the active safety device by using a first linear model in which a result determined by applying the correction value to the reference value of the target value of the passenger behavior is set to an independent variable and the operating amount of the active safety device is set to a dependent variable;
wherein the active controller determines the correction value using a second linear model in which the sensed result output from the sensing unit is set to an independent variable and the correction value is set to a dependent variable;
wherein the active controller determines the correction value by using a second linear model into which the measured passenger behavior is inputted; and
wherein the active controller sets a target chest acceleration as the target value of the passenger behavior, by estimating the vehicle behavior according to the impact acceleration pulse output from the impact sensing unit using a least mean square error method, and by estimating the passenger behavior according to the estimated vehicle behavior, and by optimizing the restraining condition realizing passenger safety according to the estimated passenger behavior in such a way that both a condition in which a total chest behavior of the passenger is less than a distance between a passenger's chest and a steering wheel just before a vehicle collision and a condition in which a passenger's chest speed is zero at an end of the collision are satisfied.

2. The active safety apparatus for the vehicle as set forth in claim 1, wherein the active controller uses feedback to control the active safety device in response to the sensed result of operating the active safety device transmitted from the sensing unit.

3. The active safety apparatus for the vehicle as set forth in claim 1, wherein
the active safety device is configured in such a way that the operating amount thereof varies in real-time under the control of the active controller; and
the sensing unit measures the passenger behavior in real-time according to operation of the active safety device and outputs a measured passenger behavior to the active controller.

4. A method of controlling an active safety apparatus for a vehicle, comprising:
estimating a vehicle behavior using an impact acceleration pulse of the vehicle;
estimating a passenger behavior based on the estimated vehicle behavior and setting a target value of the passenger behavior which satisfies a restraining condition realizing a passenger safety based on the estimated passenger behavior;
setting an operating amount of an active safety device realizing the target value of the passenger behavior;
operating the active safety device according to the operating amount;
performing control using feedback in such a way that the active controller repeatedly and periodically sets the target value of the passenger behavior by estimating both the vehicle behavior and the passenger behavior at a predetermined period, and resets the operating amount of the active safety device by applying a correction value to a reference value after setting the target value of the passenger behavior to be equal to the reference value and setting the sensed result of operating the active safety device output from the sensing unit to be equal to the correction value;

setting the operating amount of the active safety device by using a first linear model in which a result determined by applying the correction value to the reference value of the target value of the passenger behavior is set to an independent variable and the operating amount of the active safety device is set to a dependent variable; and determining the correction value using a second linear model in which the sensed result output from the sensing unit is set to an independent variable and the correction value is set to a dependent variable;

determining the correction value by using a second linear model into which the measured passenger behavior is inputted; and setting a target chest acceleration as the target value of the passenger behavior, by estimating the vehicle behavior according to the impact acceleration pulse output from the impact sensing unit using a least mean square error method, and by estimating the passenger behavior according to the estimated vehicle behavior, and by optimizing the restraining condition realizing passenger safety according to the estimated passenger behavior in such a way that both a condition in which a total chest behavior of the passenger is less than a distance between a passenger's chest and a steering wheel just before a vehicle collision and a condition in which a passenger's chest speed is zero at an end of the collision are satisfied.

5. The method of controlling the active safety apparatus for the vehicle as set forth in claim 4, wherein a passenger behavior after operation of the active safety device is sensed and the operating amount of the active safety device is adjusted by taking into account the value of the sensed passenger behavior in setting the operating amount.

\* \* \* \* \*